US 11,949,068 B2

(12) United States Patent
Lee et al.

(10) Patent No.: US 11,949,068 B2
(45) Date of Patent: Apr. 2, 2024

(54) POLYMER ELECTROLYTE AND METHOD OF PREPARING SAME (71) Applicants: Hyundai Motor Company, Seoul (KR); Kia Corporation, Seoul (KR); University of Seoul Industry Cooperation Foundation, Seoul (KR)

(72) Inventors: Ho Taek Lee, Seoul (KR); Yong Min Kim, Seoul (KR); Hong Chul Moon, Seoul (KR)

(73) Assignees: Hyundai Motor Company, Seoul (KR); Kia Corporation, Seoul (KR); University of Seoul Industry, Seoul (KR)

(*) Notice: Subject to any disclaimer, the term of this patent is extended or adjusted under 35 U.S.C. 154(b) by 216 days.

(21) Appl. No.: 17/375,167

(22) Filed: Jul. 14, 2021

(65) Prior Publication Data
US 2022/0158234 A1 May 19, 2022

(30) Foreign Application Priority Data

Nov. 17, 2020 (KR) .................. 10-2020-0153297

(51) Int. Cl.
*H01M 10/0565* (2010.01)
*C08F 2/14* (2006.01)
(Continued)

(52) U.S. Cl.
CPC ........... *H01M 10/0565* (2013.01); *C08F 2/14* (2013.01); *C08F 20/34* (2013.01);
(Continued)

(58) Field of Classification Search
CPC ..... H01M 10/0565; C08F 20/04; C08F 20/24; C08F 220/04; C08F 220/06
See application file for complete search history.

(56) References Cited

U.S. PATENT DOCUMENTS 9,166,254 B2  10/2015  Tsai et al.
9,647,293 B2   5/2017  Shan et al.
(Continued)

FOREIGN PATENT DOCUMENTS

JP    2007280912 A  * 10/2007
JP    4812055 B2    * 11/2011
(Continued)

OTHER PUBLICATIONS

Ye et al, High performance composite polymer electrolytes using polymeric ionic liquid-functionalized graphene molecular brushes, Journal of Materials Chemistry, 3, 18064-18073. (Year: 2015).*
(Continued)

*Primary Examiner* — Amanda C. Walke
(74) *Attorney, Agent, or Firm* — Slater Matsil, LLP (57) ABSTRACT A polymer electrolyte includes a polymer matrix including a polymer having a repeating unit represented by the formula

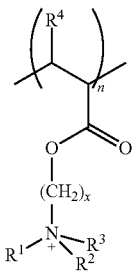

and an ionic liquid. $R^1$ to $R^3$ are each one of a substituted or unsubstituted $C_1$-$C_{12}$ alkyl group, a substituted or unsubstituted aryl group, a substituted or unsubstituted heteroaryl
(Continued)

group, or combinations thereof. Each $R^4$ is one of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted $C_5$-$C_{14}$ heteroaryl group, or combinations thereof. Substituents of $R^1$ to $R^4$ are each one of a halogen group, a cyano group, a nitro group, a $C_1$-$C_8$ alkyl group, or combinations thereof, x is an integer of 1 to 8, and n is an integer of 60 to 3200.

20 Claims, 6 Drawing Sheets (51) Int. Cl.
 *C08F 20/34* (2006.01)
 *H01M 10/0525* (2010.01)
(52) U.S. Cl.
 CPC ............ *H01M 10/0525* (2013.01); *H01M 2300/0082* (2013.01); *H01M 2300/0085* (2013.01)

(56) References Cited

U.S. PATENT DOCUMENTS

| 2017/0117536 A1* | 4/2017 | Choi | C08F 8/44 |
| 2020/0203723 A1* | 6/2020 | Choi | C08F 212/08 |
| 2020/0287240 A1* | 9/2020 | Hudak | H01M 10/0525 |

FOREIGN PATENT DOCUMENTS

| KR | 20050083533 A | 8/2005 | | |
| KR | 20190088212 A | 7/2019 | | |
| WO | WO-2006100085 A1 * | 9/2006 | | H01M 10/052 |
| WO | WO-2011087029 A1 * | 7/2011 | | C08F 16/06 |
| WO | 2014186980 A1 | 11/2014 | | |
| WO | 2016053065 A1 | 4/2016 | | |

OTHER PUBLICATIONS

Li et al, New polymerized ionic liquid (PIL) gel electrolyte membranes based on tetraalkylammonium cations for lithium ion batteries, Journal of Membrane Science, vol. 447, 222-227. (Year: 2013).*
Ding, Yi, et al., "Preparation of High-Performance Ionogels with Excellent Transparency, Good Mechanical Strength, and High Conductivity", Advanced Materials, vol. 29, Oct. 30, 2017, 8 pages.
Tamate, Ryota, et al., "Self-Healing Micellar Ion Gels Based on Multiple Hydrogen Bonding", Advanced Materials, vol. 30, Jul. 31, 2018, 8 pages.
Cowan, Matthew G., et al., "Imidazolium-Based Poly(ionic liquid)/Ionic Liquid Ion-Gels with High Ionic Conductivity Prepared from a Curable Poly(ionic liquid)", Macromolecular Rapid Communications, vol. 37, May 6, 2016, pp. 1150-1154.
Tang, Boxin, et al., "Synergistic Increase in Ionic Conductivity and Modulus of Triblock Copolymer Ion Gels", Macromolecules, vol. 48, Jul. 7, 2015, pp. 4942-4950.
Evans, Russell G., et al., "Oxidation of N,N,N', N'-tetraalkyl-paraphenylenediamines in a series of room temperature ionic liquids incorporating the bis(trifluoromethylsulfonyl)imide anion", Journal of Electroanalytical Chemistry 556, May 1, 2003, pp. 179-188.
Gu, Yanyan, et al., "High Toughness, High Conductivity Ion Gels by Sequential Triblock Copolymer Self-Assembly and Chemical Cross-Linking", Journal of the American Chemical Society, Jun. 18, 2013, pp. 9652-9655.
Yim, Taeeun, et al., "Synthesis and Properties of Acyclic Ammonium-based Ionic Liquids with Allyl Substituents as Electrolytes", Molecules, vol. 14, May 15, 2009, pp. 1840-1851.
Chung, Hoon Taek, et al., "Cation-Hydroxide-Water Coadsorption Inhibits the Alkaline Hydrogen Oxidation Reaction", The Journal of Physical Chemistry Letters, vol. 7, Oct. 24, 2016, pp. 4464-4469.

* cited by examiner

POLYMER ELECTROLYTE AND METHOD OF PREPARING SAME

CROSS-REFERENCE TO RELATED APPLICATIONS

This application claims the benefit of Korean Patent Application No. 10-2020-0153297, filed on Nov. 17, 2020, which application is hereby incorporated herein by reference.

TECHNICAL FIELD

The present disclosure relates to a polymer electrolyte and a method of preparing the same.

BACKGROUND

Lithium-ion batteries are energy storage devices that have a wide range of application, from small electronic devices to electric vehicles, and have very high application potential. All parts included in the lithium-ion battery, such as cathode/anode materials, a membrane, an electrolyte and the like, may affect the performance of the lithium-ion battery, and thorough research thereon is ongoing.

Despite thorough research thereon, existing liquid electrolytes continue to have problems such as depletion due to leakage/side reactions, flammability, and high vapor pressure at high temperatures, and existing solid electrolytes are disadvantageous because of the excessively low ionic conductivity thereof.

Therefore, there is the need for a polymer electrolyte that maintains a solid phase but is not volatile and has both high ionic conductivity and high stability and thus may be utilized in lithium-ion batteries.

Korean Patent Application Publication No. 10-2019-0088212 describes information related to the present subject matter.

SUMMARY

Therefore, embodiments of the present disclosure have been made keeping in mind problems encountered in the related art, and specific objectives thereof are as follows.

The present disclosure relates to a polymer electrolyte and a method of preparing the same. Particular embodiments relate to a polymer electrolyte having high ionic conductivity without deterioration in mechanical properties and a method of preparing the same.

An embodiment of the present disclosure provides a polymer electrolyte including a polymer matrix including a polymer having an ammonium-based repeating unit and an ionic liquid, preferably a polymer electrolyte further including a metal salt.

Another embodiment of the present disclosure provides a method of preparing a polymer electrolyte including a polymer matrix including a polymer having an ammonium-based repeating unit and an ionic liquid, preferably a polymer electrolyte further including a metal salt.

The embodiments of the present disclosure are not limited to the foregoing, and will be able to be clearly understood through the following description and to be realized by the means described in the claims and combinations thereof.

An embodiment of the present disclosure provides a polymer electrolyte, including a polymer matrix including a polymer having a repeating unit represented by Chemical Formula 1 below and an ionic liquid:

[Chemical Formula 1]

(in which $R^1$ to $R^3$ are each independently selected from the group consisting of a substituted or unsubstituted $C_1$-$C_{12}$ alkyl group, a substituted or unsubstituted aryl group, a substituted or unsubstituted heteroaryl group, and combinations thereof, each $R^4$ is independently selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted $C_5$-$C_{14}$ heteroaryl group, and combinations thereof, substituents of $R^1$ to $R^4$ are each independently selected from the group consisting of a halogen group, a cyano group, a nitro group, a $C_1$-$C_8$ alkyl group, and combinations thereof, x is an integer of 1 to 8, and n is an integer of 60 to 3200).

The polymer electrolyte may include 15 to 60 wt % of the polymer matrix and 40 to 85 wt % of the ionic liquid.

The polydispersity index (PDI) of the polymer matrix may be 2.00 to 3.00.

The ionic liquid may be selected from the group consisting of N-methyl-N-butyl-pyrrolidinium bis(trifluoromethylsulfonyl)imide ([P$_{14}$][TFSI]), 1-ethyl-3-methylimidazolium bis(trifluoromethylsulfonyl)imide ([EMI][TFSI]), 1-ethyl-3-methylimidazolium hexafluorophosphate ([EMI][PF6]), 1-ethyl-3-methylimidazolium tetrafluoroborate ([EMI][BF4]), 1-butyl-3-methylimidazolium bis(trifluoromethylsulfonyl)imide ([BMI][TFSI]), 1-butyl-3-methylimidazolium hexafluorophosphate ([BMI][PF6]), 1-butyl-3-methylimidazolium tetrafluoroborate ([BMI][BF4]), and combinations thereof.

The polymer electrolyte may have ionic conductivity of 0.50 to 2.60 mS/cm.

The polymer electrolyte may further include a metal salt.

In the polymer electrolyte further including the metal salt, the amount of the metal salt may be 1.5 to 40.0 wt % based on a total of 100 wt % of the polymer electrolyte.

The metal of the metal salt may be selected from the group consisting of lithium (Li), sodium (Na), potassium (K), calcium (Ca), magnesium (Mg), and combinations thereof.

The ionic conductivity of the polymer electrolyte further including the metal salt may be 0.20 to 1.80 mS/cm.

Another embodiment of the present disclosure provides a method of preparing a polymer electrolyte, including preparing a polymer matrix including a polymer obtained by polymerizing a monomer represented by Chemical Formula 2 below; and mixing an ionic liquid with the polymer matrix:

[Chemical Formula 2]

(in which R¹ to R³ are each independently selected from the group consisting of a substituted or unsubstituted $C_1$-$C_{12}$ alkyl group, a substituted or unsubstituted aryl group, a substituted or unsubstituted heteroaryl group, and combinations thereof, R⁴ to R⁶ are each independently selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted $C_5$-$C_{14}$ heteroaryl group, and combinations thereof, substituents of R¹ to R⁶ are each independently selected from the group consisting of a halogen group, a cyano group, a nitro group, $C_1$-$C_8$ alkyl group, and combinations thereof, and x is an integer of 1 to 8).

The monomer represented by Chemical Formula 2 may have a glass transition temperature (Tg) of −50 to 0° C.

Preparing the polymer matrix may be performed in one pot.

The ionic liquid may be selected from the group consisting of N-methyl-N-butyl-pyrrolidinium bis(trifluoromethylsulfonyl)imide ([P₁₄][TFSI]), 1-ethyl-3-methylimidazolium bis(trifluoromethylsulfonyl)imide ([EMI][TFSI]), 1-ethyl-3-methylimidazolium hexafluorophosphate ([EMI][PF6]), 1-ethyl-3-methylimidazolium tetrafluoroborate ([EMI][BF4]), 1-butyl-3-methylimidazolium bis(trifluoromethylsulfonyl)imide ([BMI][TFSI]), 1-butyl-3-methylimidazolium hexafluorophosphate ([BMI][PF6]), 1-butyl-3-methylimidazolium tetrafluoroborate ([BMI][BF₄]), and combinations thereof.

The method of preparing the polymer electrolyte may further include mixing a metal salt.

The metal of the metal salt may be selected from the group consisting of lithium (Li), sodium (Na), potassium (K), calcium (Ca), magnesium (Mg), and combinations thereof.

Embodiments of the present disclosure pertain to a polymer electrolyte and a method of preparing the same. The polymer electrolyte prepared according to embodiments of the present disclosure includes a polymer matrix, an ionic liquid, and an ionic salt, which are used in appropriate amounts, despite the low glass transition temperature (Tg) of the monomer used to prepare the polymer matrix, thus exhibiting superior mechanical properties, high ionic conductivity, and high stability due to the wide electrochemical window thereof.

The effects of embodiments of the present disclosure are not limited to the foregoing, and should be understood to include all effects that can be reasonably anticipated from the following description.

DETAILED DESCRIPTION OF ILLUSTRATIVE EMBODIMENTS

The above and other objectives, features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Unless otherwise specified herein, a "$C_1$-$C_{10}$ alkyl group" refers to a primary to tertiary alkyl group having 1 to 10 carbon atoms. The alkyl group may be, for example, a functional group such as a methyl, ethyl, n-propyl, i-propyl, n-butyl, i-butyl, tert-butyl, or n-hexyl group or the like.

Unless otherwise specified herein, a "$C_1$-$C_{10}$ alkoxy" refers to an —O—R group, in which R includes a "$C_1$-$C_{10}$ alkyl", "aryl", "heteroaryl", or "benzyl". The preferred alkoxy group includes, for example, methoxy, ethoxy, phenoxy, benzyloxy, and the like.

Unless otherwise specified herein, an aryl group refers to a chemical group obtained by removing one hydrogen atom from a $C_2$-$C_{30}$ monocyclic or polycyclic compound containing at least one benzene ring and derivatives thereof. Examples of the monocyclic or polycyclic compound containing the benzene ring may include a benzene ring, toluene or xylene in which an alkyl side chain is attached to the benzene ring, biphenyl in which two or more benzene rings are linked through a single bond, fluorene, xanthene or anthraquinone in which the benzene ring is condensed with a cycloalkyl group or a heterocycloalkyl group, naphthalene or anthracene in which two or more benzene rings are condensed, and the like.

Unless otherwise specified herein, the prefix "hetero" means that 1 to 3 hetero atoms selected from the group consisting of —N—, —O—, —S— and —P— substitute for carbon atoms. Examples thereof may include pyridine, pyrrole or carbazole, containing a nitrogen atom as a hetero atom, furan or dibenzofuran, containing an oxygen atom as a hetero atom, dibenzothiophene, diphenylamine, and the like.

Unless otherwise specified herein, a halogen group is a Group 17 element, and may be, for example, a fluoro group, a chloro group, a bromo group, or an iodo group.

Unless otherwise specified herein, the bonding lines at both ends of a Chemical Formula without any substituent indicate portions where the compound is connected to another compound.

Polymer Electrolyte

A polymer electrolyte according to an embodiment of the present disclosure includes a polymer matrix including a polymer having an ammonium-based repeating unit and an ionic liquid, and preferably further includes a metal salt.

The polymer matrix according to an embodiment of the present disclosure includes a polymer having an ammonium-based repeating unit. Preferably, the polymer having the ammonium-based repeating unit may be a polymer having a repeating unit represented by Chemical Formula 1 below.

[Chemical Formula 1]

Each of $R^1$ to $R^3$ may be independently selected from the group consisting of a substituted or unsubstituted $C_1$-$C_{12}$ alkyl group, a substituted or unsubstituted aryl group, a substituted or unsubstituted heteroaryl group, and combinations thereof.

Each $R^4$ may be independently selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted $C_5$-$C_{14}$ heteroaryl group, and combinations thereof.

Each of substituents of $R^1$ to $R^4$ may be independently any one selected from the group consisting of a halogen group, a hydroxy group, a carboxyl group, a cyano group, a nitro group, an amino group, a thio group, a methylthio group, an alkoxy group, a nitrile group, an aldehyde group, an epoxy group, an ether group, an ester group, a carbonyl group, an acetal group, a ketone group, an alkyl group, a perfluoroalkyl group, a cycloalkyl group, a heterocycloalkyl group, a benzyl group, an aryl group, a heteroaryl group, derivatives thereof, and combinations thereof, each of which substitutes for hydrogen. Preferably, each substituent is a halogen group, a cyano group, a nitro group, or a $C_1$-$C_8$ alkyl group.

Here, x represents the number of chains of the —($CH_2$)— group, and may be an integer of 1 to 8. As x is closer to 8, an effect of improving ionic conductivity and increasing mechanical strength due to a decrease in the glass transition temperature may be expected.

Also, n is the number of repeating units represented by Chemical Formula 1, and n may be an integer of 60 to 3200, and preferably an integer of 1266 to 1582. If n is lower than 60, mechanical strength may decrease, whereas if n exceeds 3200, ionic conductivity may be lowered.

The polymer that is contained in the polymer matrix according to an embodiment of the present disclosure may be configured such that the repeating unit represented by Chemical Formula 1 is repeatedly connected.

The polydispersity index (PDI) of the polymer matrix according to an embodiment of the present disclosure may be 2.00 to 3.00. As used herein, the term "polydispersity index" is the ratio of the weight average molecular weight relative to the number average molecular weight.

Accordingly, the number average molecular weight ($M_n$) of the polymer matrix may be 200,000 to 250,000 g/mol. If the number average molecular weight of the polymer matrix is less than 200,000 g/mol, mechanical strength may decrease, whereas if it exceeds 250,000 g/mol, ionic conductivity may be lowered.

The polymer matrix according to embodiments of the present disclosure is characterized in that the solubility of the polymer electrolyte prepared including the same in an ionic liquid may be maintained by appropriately adjusting the ratio of the repeating unit constituting the polymer and the weight average molecular weight thereof.

An ionic liquid according to an embodiment of the present disclosure is an ionic compound that is a liquid at a temperature of 100° C. or less. More generally, the ionic liquid may be a salt having a melting point lower than or equal to room temperature (20° C. to 25° C.). The ionic liquid according to embodiments of the present disclosure is not particularly limited, so long as it is able to increase the ionic conductivity of the polymer electrolyte prepared therefrom.

The ionic liquid according to an embodiment of the present disclosure may include at least one selected from the group consisting of N-methyl-N-butyl-pyrrolidinium bis(trifluoromethylsulfonyl)imide ([$P_{14}$][TFSI]), 1-ethyl-3-methylimidazolium bis(trifluoromethylsulfonyl)imide ([EMI][TFSI]), 1-ethyl-3-methylimidazolium hexafluorophosphate ([EMI][PF6]), 1-ethyl-3-methylimidazolium tetrafluoroborate ([EMI][BF4]), 1-butyl-3-methylimidazolium bis(trifluoromethylsulfonyl)imide ([BMI][TFSI]), 1-butyl-3-methylimidazolium hexafluorophosphate ([BMI][PF6]), 1-butyl-3-methylimidazolium tetrafluoroborate ([BMI][BF4]), and combinations thereof, and preferably includes N-methyl-N-butyl-pyrrolidinium bis(trifluoromethylsulfonyl)imide ([$P_{14}$][TFSI]), having a wide electrochemical window.

The polymer electrolyte according to an embodiment of the present disclosure may include 10 to 60 wt % of the polymer matrix and 40 to 90 wt % of the ionic liquid. If the amount of the polymer matrix is less than 10 wt %, the amount of the lithium salt ions that may be contained in the polymer electrolyte and mechanical strength may decrease. On the other hand, if the amount thereof exceeds 60 wt %, ionic conductivity may be lowered. Also, if the amount of the ionic liquid is less than 40 wt %, ionic conductivity may be lowered. On the other hand, if the amount thereof exceeds 90 wt %, mechanical strength may decrease.

Thus, the polymer electrolyte prepared according to embodiments of the present disclosure is configured such that the polymer matrix including the polymer and the ionic liquid are homogeneously mixed, and has ionic conductivity of 0.50 to 2.60 mS/cm, indicating superior ionic conductivity. The polymer electrolyte may further include a metal salt, as will be described later, thereby maximizing ionic conductivity.

The polymer electrolyte according to an embodiment of the present disclosure may further include a metal salt, in addition to the polymer matrix and the ionic liquid.

The metal contained in the metal salt according to an embodiment of the present disclosure may include at least one selected from the group consisting of lithium (Li), sodium (Na), potassium (K), calcium (Ca), magnesium (Mg), and combinations thereof. Thus, the metal salt according to an embodiment of the present disclosure may include at least one selected from the group consisting of, for example, [Li][TFSI], [Na][N], [K][Cl], and [Ca][$CO_3$], and preferably includes [Li][TFSI], suitable for use in batteries, because the anion is the same as EMI TFSI and the size of Li ions is small.

The polymer electrolyte according to embodiments of the present disclosure may include 1.5 to 40.0 wt % of the metal salt based on a total of 100 wt % of the polymer electrolyte. If the amount of the metal salt exceeds 40.0 wt %, Li ions may precipitate, and it may be difficult to form a uniform gel.

The polymer electrolyte according to embodiments of the present disclosure includes the polymer matrix including the polymer and the ionic liquid, which are uniformly mixed together, and further includes the metal salt, so the ionic conductivity thereof is 0.20 to 1.80 mS/cm, and the electrochemical window thereof is 4.88 V, showing that the ionic conductivity is further increased and high electrochemical stability is exhibited compared to existing technology.

Method of Preparing Polymer Electrolyte

Figure 1:
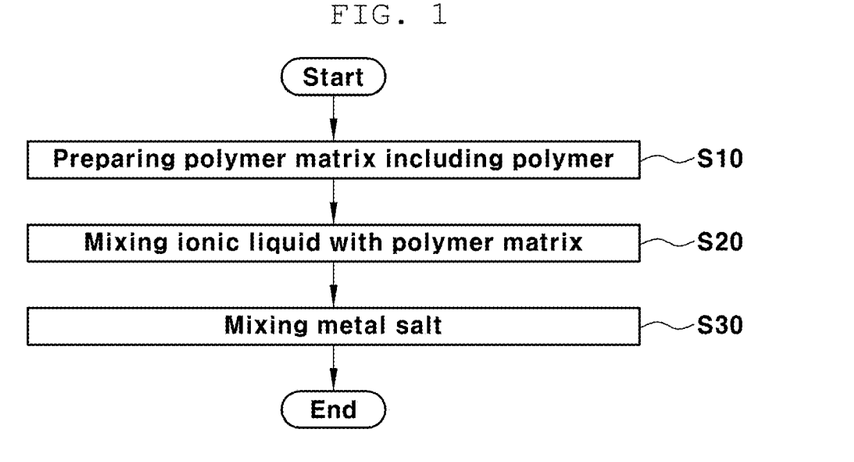
FIG. 1 is a flowchart showing a process of preparing a polymer electrolyte according to an embodiment of the present disclosure.

FIG. 1 is a flowchart showing the process of preparing a polymer electrolyte according to embodiments of the present disclosure. With reference thereto, the method may include preparing a polymer matrix including a polymer (S10) and mixing an ionic liquid with the polymer matrix (S20), and may further include mixing a metal salt (S30).

Preparing the polymer matrix (S10) is a step of preparing a polymer matrix including a polymer obtained by polymerizing a monomer represented by Chemical Formula 2 below.

[Chemical Formula 2]

Here, $R^1$ to $R^3$ and $R^4$ may be the same as or different from those described in the polymer matrix, $R^5$ and $R^6$ may be the same as or different from $R^4$, and x may also be the same as or different from that described in the polymer matrix.

According to embodiments of the present disclosure, the monomer represented by Chemical Formula 2 may have a glass transition temperature (Tg) of −50 to 0° C. If the glass transition temperature thereof is lower than −50° C., mechanical strength may decrease, whereas if it exceeds 0° C., ionic conductivity may be lowered due to a decrease in chain mobility. Specifically, embodiments of the present disclosure are intended to prepare a polymer electrolyte from a monomer having a glass transition temperature within a range appropriate for improving the chain mobility and the ionic conductivity of the ionic liquid, and is thus characterized by having superior ionic conductivity compared to polymer electrolytes manufactured using existing technology. Moreover, since the polymer matrix according to embodiments of the present disclosure contains an ammonium group having a certain chain group, the polymer electrolyte prepared therefrom has a wide electrochemical window, thereby improving the stability of the battery.

Examples of methods for polymerization of the polymer according to the present disclosure may include free-radical polymerization, living anionic polymerization, living cationic polymerization, controlled radical polymerization, RAFT (reversible addition-fragmentation chain transfer), ATRP (atom transfer radical polymerization), NMP (nitroxide-mediated polymerization), and the like. Preferable is free-radical polymerization, in which the reaction is easy and simple. In the case of polymerization using the free-radical polymerization process, the monomer and azobisisobutyronitrile (AIBN) may be mixed, purged with Ar gas at room temperature for 30 minutes to 1.5 hours, and then polymerized at a temperature of 78° C. to 82° C. After polymerization, the solution may be optionally quenched with liquid nitrogen and precipitated in excess methanol to obtain a polymer, which may then be filtered and dried under reduced pressure at 30° C. to 70° C. for purification. This process may be repeated 2 to 5 times for further purification.

Since the step of preparing the polymer matrix including the polymer according to embodiments of the present disclosure is performed through a one-pot reaction and does not include the addition of an additional functional group, the polymer matrix according to embodiments of the present disclosure may be prepared simply and effectively, so the processing step is simple and the processing efficiency and economy are excellent.

In the steps of mixing the ionic liquid (S30) and mixing the metal salt (S30), the ionic liquid and also the metal salt are mixed with the polymer matrix prepared above. Here, the mixing process may be performed through a typical process of uniformly dispersing the polymer matrix and/or the metal salt in the ionic liquid, for example, stirring at room temperature using a magnetic bar. The ionic liquid and the metal salt to be mixed may be the same as or different from those described above.

A better understanding of embodiments of the present invention will be given through the following examples, which are merely set forth to illustrate embodiments of the present invention and are not to be construed as limiting the scope of the present invention.

Example 1-1

Polymer Electrolyte not Including Metal Salt (S10) A polymer matrix, poly((2-acryloyloxy)-N,N,N-trimethylethanaminium) (TFSI) [[PATMA][TFSI]], was synthesized through free-radical polymerization (Scheme 1 below).

[Scheme 1]

-continued

Specifically, a solution obtained by dissolving a monomer ([2-(acryloyloxy)ethyl]trimethylammonium)(chloride) (30 g, 0.154 mol) in 100 ml of water and a solution obtained by dissolving [Li][TFSI] (66.32 g, 0.231 mol) in 100 ml of water were allowed to react in a flask equipped with a stirrer, after which a monomer [2-(acryloyloxy)ethyl]trimethylammonium (TFSI) was obtained using a separatory funnel.

Subsequently, the monomer [2-(acryloyloxy)ethyl]trimethylammonium (TFSI) prepared above was passed through a column packed with basic alumina. Thereafter, the monomer [2-(acryloyloxy)ethyl]trimethylammonium (TFSI) (12.6 g, 28.24 mmol) and AIBN (5 mg, 0.03 mmol) were placed in a flask equipped with a magnetic stirring bar. The reaction mixture was purged with argon gas at room temperature for 1 hour and then allowed to react at 80° C. After 15 hours, the solution was quenched with liquid nitrogen. The reaction product was precipitated in excess methanol to afford [PATMA][TFSI], which was then filtered and dried under reduced pressure at 60° C. This process was repeated 3 times for further purification. The number average molecular weight ($M_n$) and the weight average molecular weight ($M_w$) of the polymer matrix, measured through size exclusion chromatography (SEC) calibrated with PS standards, were 195,000 g/mol and 478,000, respectively, and the polydispersity index (PDI) thereof was 2.45.

(S20) N-methyl-N-butyl-pyrrolidinium bis(trifluoromethylsulfonyl)imide ([$P_{14}$][TFSI]) as an ionic liquid was mixed therewith at 60° C., thereby preparing a polymer electrolyte including 20 wt % of the polymer matrix and 80 wt % of the ionic liquid.

Example 1-2

Polymer Electrolyte not Including Metal Salt

A polymer electrolyte was prepared in the same manner as in Example 1-1, with the exception that [$P_{14}$][TFSI] as an ionic liquid was mixed at 25° C., thereby preparing a polymer electrolyte, in contrast with Example 1-1.

Example 2-1

Polymer Electrolyte not Including Metal Salt

A polymer electrolyte was prepared in the same manner as in Example 1-1, with the exception that a monomer [PATMA][TFSI] and an ionic liquid [$P_{14}$][TFSI] were mixed at 60° C., thereby preparing a polymer electrolyte including 30wt % of the polymer matrix and 70 wt % of the ionic liquid, in contrast with Example 1-1.

Example 2-2

Polymer Electrolyte not Including Metal Salt

A polymer electrolyte was prepared in the same manner as in Example 2-1, with the exception that an ionic liquid [P$_{14}$][TFSI] was mixed at 25° C., thereby preparing a polymer electrolyte, in contrast with Example 2-1.

Example 3-1 To Example 3-4

Polymer Electrolyte Including Metal Salt ([Li][TFSI])

Respective polymer electrolytes were prepared in the same manner as in Example 1-1, with the exception that the polymer electrolyte was prepared using 10 wt % of a metal salt (Example 3-1), 20 wt % of a metal salt (Example 3-2), 30 wt % of a metal salt (Example 3-3), and 40 wt % of a metal salt (Example 3-4), based on a total of 100 wt % of the polymer electrolyte, at 60° C., in contrast with Example 1-1.

Example 4-1 to Example 4-4

Polymer Electrolyte Including Metal Salt ([Li][TFSI])

Respective polymer electrolytes were prepared in the same manner as in Example 1-1, with the exception that the polymer electrolyte was prepared using 10 wt % of a metal salt (Example 4-1), 20 wt % of a metal salt (Example 4-2), 30 wt % of a metal salt (Example 4-3), and 40 wt % of a metal salt (Example 4-4), based on a total of 100 wt % of the polymer electrolyte, at 25° C., in contrast with Example 1-1.

Comparative Example 1-1

Polymer Electrolyte not Including Metal Salt

A polymer electrolyte was prepared in the same manner as in Example 1-1, with the exception that a monomer [PATMA][TFSI] and an ionic liquid [P$_{14}$][TFSI] were mixed at 60° C., thereby preparing a polymer electrolyte including 10 wt % of the polymer matrix and 90 wt % of the ionic liquid, in contrast with Example 1-1.

Comparative Example 1-2

Polymer Electrolyte not Including Metal Salt

A polymer electrolyte was prepared in the same manner as in Comparative Example 1-1, with the exception that an ionic liquid [P$_{14}$][TFSI] was mixed at 25° C., thereby preparing a polymer electrolyte, in contrast with Comparative Example 1-1.

Comparative Example 2-1 to Comparative Example 2-4

Polymer Electrolyte Including Metal Salt ([Li][TFSI])

Respective polymer electrolytes were prepared in the same manner as in Comparative Example 1-1, with the exception that the polymer electrolyte was prepared using 10 wt % of a metal salt (Comparative Example 2-1), 20 wt % of a metal salt (Comparative Example 2-2), 30 wt % of a metal salt (Comparative Example 2-3), and 40 wt % of a metal salt (Comparative Example 2-4), based on a total of 100 wt % of the polymer electrolyte, at 60° C., in contrast with Comparative Example 1-1.

Test Example 1

Confirmation of Structure of Prepared Polymer Matrix

Figure 2:
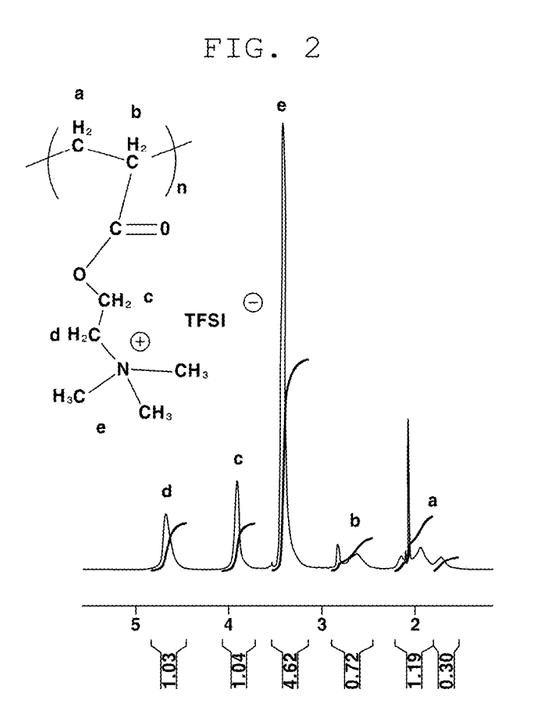
FIG. 2 is a graph showing a 1H NMR spectrum of poly((2-acryloyloxy)-N,N,N-trimethylethanaminium) (TFSI) ([PATMA][TFSI]), which is a polymer matrix contained in the polymer electrolyte prepared according to an embodiment of the present disclosure.

Based on the $^1$H NMR spectrum shown in FIG. 2, it was confirmed that the polymer was successfully synthesized. Specifically, as shown in FIG. 2, hydrogen of the methyl group near the carbonyl group that was relatively less stripped was observed through the peak locations and peak areas of the regions a and b, hydrogen atoms of the methyl group (CH$_2$) that was relatively more stripped due to the adjacent carbonyl group, oxygen atom, and nitrogen atom were observed through the peak locations and peak areas of the regions c and d, and hydrogen of the methyl groups (CH$_3$) attached to the nitrogen atom was observed through the peak location and relatively largest peak area of the region e, indicating that the poly((2-acryloyloxy) -N,N,N-trimethylethanaminium)(TFSI) [PATMA][TFSI] according to embodiments of the present disclosure was successfully synthesized.

Test Example 2

Measurement of Electrochemical Impedance Spectroscopy (EIS) of Polymer Electrolyte not Including Metal Salt The polymer electrolyte of each of Examples 1-1 and 2-1 and Comparative Example 1-1 was prepared, and 12 wt % of acetone based on the weight of the polymer matrix was added to form a membrane having a thickness of 0.04 mm and a diameter of 18 mm, and the EIS thereof was measured. The results thereof are shown in FIGS. 3A to 3C.

Figure 3A:
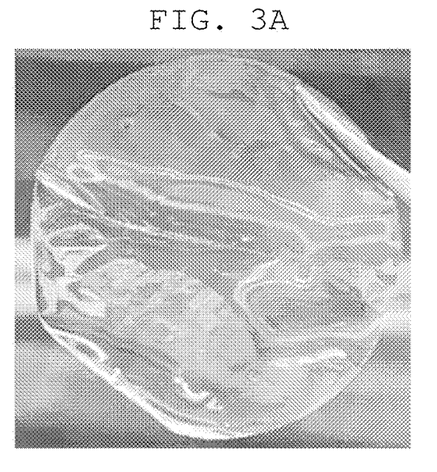
FIGS. 3A to 3C show the results of electrochemical impedance spectroscopy (EIS) performed on the polymer electrolytes of Comparative Example 1-1 (FIG. 3A), Example 1-1 (FIG. 3B), and Example 2-1 (FIG. 3C) according to embodiments of the present disclosure.
Figure 3B:
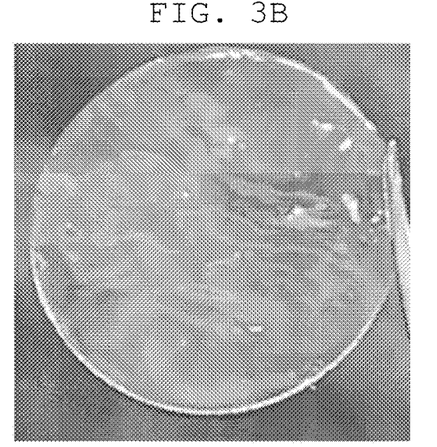
Figure 3C:
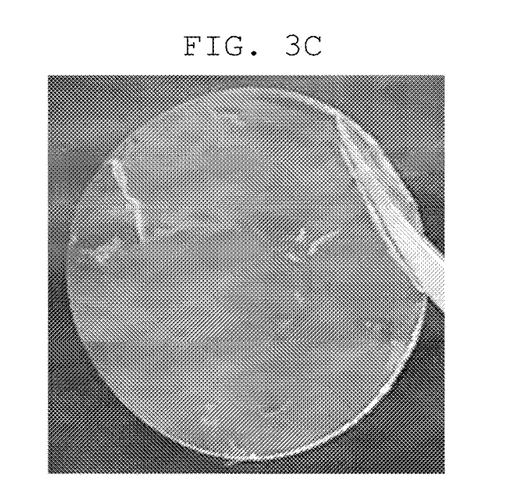

With reference to FIGS. 3A to 3C, the membrane made of the polymer electrolyte of Comparative Example 1-1, in which the amount of the ionic liquid was relatively highest, caused a flow-down phenomenon, from which it can be found that, in order to attain the minimum mechanical strength, the polymer matrix must be included in an amount greater than 10 wt % based on a total of 100 wt % of the polymer electrolyte.

Test Example 3

Measurement of Ionic Conductivity of Polymer Electrolyte not Including Metal Salt The polymer electrolyte of each of Example 1-1 to Example 2-2 and Comparative Examples 1-1 and 1-2 was prepared using the ionic liquid at different concentrations depending on the temperature, after which the ionic conductivity thereof was measured. The results thereof are shown in Table 1 below and in FIGS. 4A and 4B.

TABLE 1

| Ionic | Ionic conductivity (mS/cm) | | |
|---|---|---|---|
| liquid | 90 wt % | 80 wt % | 70 wt % |
| 25° C. | 1.33 | 0.93 | 0.59 |
| | (Comparative Example 1-2) | (Example 1-2) | (Example 2-2) |

TABLE 1-continued

| Ionic liquid | Ionic conductivity (mS/cm) | | |
|---|---|---|---|
| | 90 wt % | 80 wt % | 70 wt % |
| 60° C. | 2.55 (Comparative Example 1-1) | 1.89 (Example 1-1) | 1.58 (Example 2-1) |

Figure 4A:
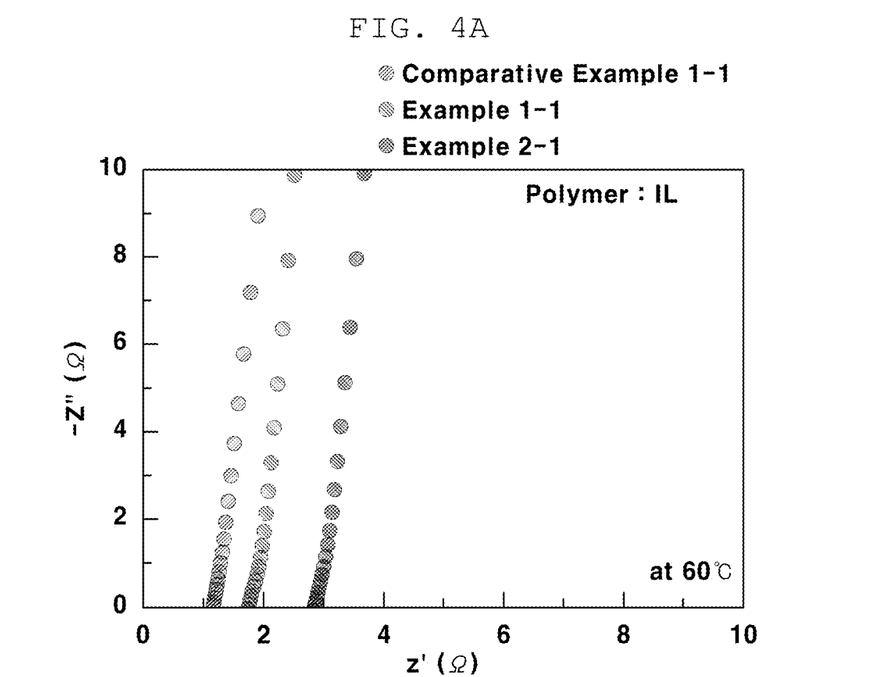
FIG. 4A is a graph showing the results of measurement of the ionic conductivity of the polymer electrolyte of each of Examples 1-1 and 2-1 and Comparative Example 1-1.
Figure 4B:
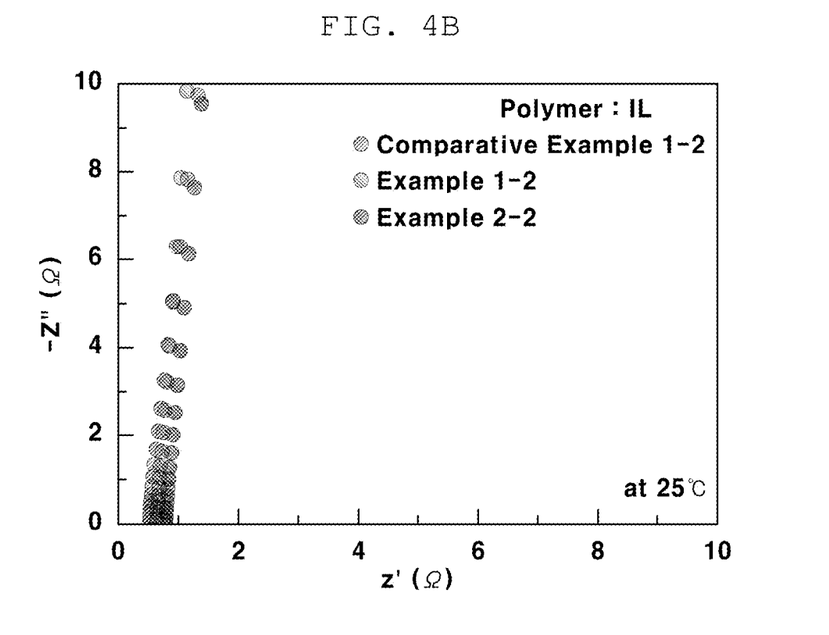
FIG. 4B is a graph showing the results of measurement of the ionic conductivity of the polymer electrolyte of each of Examples 1-2 and 2-2 and Comparative Example 1-2, according to embodiments of the present disclosure.

With reference to Table 1 and FIGS. 4A and 4B, the higher the temperature and the higher the concentration of the ionic liquid, the higher the ionic conductivity. However, referring to Test Example 2, since the mechanical strength of the polymer electrolyte weakens when the amount of the ionic liquid exceeds the appropriate level, it can be confirmed that the ionic conductivity and the mechanical strength are in a trade-off relationship. Therefore, it can be concluded that the polymer electrolyte not including the metal salt according to an embodiment of the present disclosure exhibited increased ionic conductivity while maintaining mechanical strength when including 15 to 60 wt % of the polymer matrix and 40 to 85 wt % of the ionic liquid.

Test Example 4

Measurement of Electrochemical Impedance Spectroscopy (EIS) of Polymer Electrolyte Including Metal Salt The polymer electrolyte including the metal salt in a specific amount of each of Examples 3-1 to 3-4 and Comparative Examples 2-1 to 2-4 was prepared, and 12 wt % of acetone based on the weight of the polymer matrix was added to form a membrane having a thickness of 0.04 mm and a diameter of 18 mm, and the EIS thereof was measured. The results thereof are shown in FIGS. 5A and 5B.

Figure 5A:
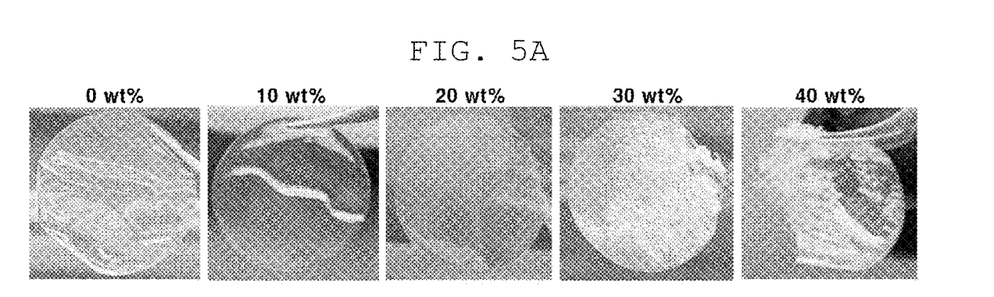
FIG. 5A shows the results of electrochemical impedance spectroscopy (EIS) performed on the polymer electrolyte of each of Comparative Example 1-1 (0 wt %), Comparative Example 2-1 (10 wt %), Comparative Example 2-2 (20 wt %), Comparative Example 2-3 (30 wt %), and Comparative Example 2-4 (40 wt %)
Figure 5B:
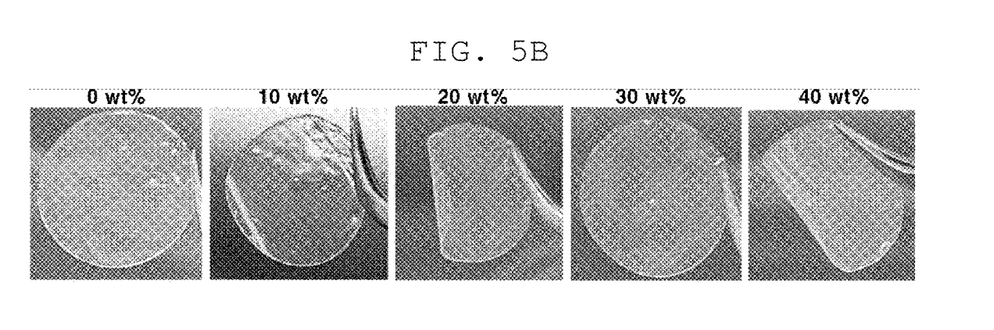
FIG. 5B shows the results of electrochemical impedance spectroscopy (EIS) performed on the polymer electrolyte of each of Example 1-1 (0 wt %), Example 3-1 (10 wt %), Example 3-2 (20 wt %), Example 3-3 (30 wt %), and Example 3-4 (40 wt %), according to embodiments of the present disclosure.

With reference to FIGS. 5A and 5B, in the polymer electrolytes of Comparative Examples 2-1 to 2-4, in which the amount of the polymer was relatively low, it can be confirmed that the higher the amount of the metal salt, the smaller the flow-down of the membrane, so the mechanical strength thereof was increased. However, when the amount of the metal salt exceeded 30 wt %, the shape of the membrane was distorted.

In contrast, in the polymer electrolytes of Examples 3-1 to 3-4, in which the amount of the polymer was relatively high, it can be confirmed that the membrane had a rigid shape when the amount of the metal salt was 10 wt % or more.

Also, the polymer electrolytes of Examples 3-1 to 3-4, in which the amount of the polymer was relatively high, contained lithium ions ($Li^+$) in greater amounts than the polymer electrolytes of Comparative Examples 2-1 to 2-4, in which the amount of the polymer was relatively low.

Therefore, it can be concluded that the polymer electrolyte including the metal salt according to an embodiment of the present disclosure, including 15 to 60 wt % of the polymer matrix and 40 to 85 wt % of the ionic liquid, exhibited increased ionic conductivity by increasing the amount of the lithium ions ($Li^+$) while maintaining mechanical strength when the amount of the metal salt fell in the range of 40 wt % or less but exceeding 0 wt %.

Test Example 5

Measurement of Ionic Conductivity of Polymer Electrolyte Including Metal Salt

The polymer electrolyte of each of Example 3-1 to Example 4-4 was prepared using the metal salt at different concentrations depending on the temperature, after which the ionic conductivity thereof was measured. The results thereof are shown in Table 2 below and in FIGS. 6A and 6B.

TABLE 2

| Ionic salt | Ionic conductivity (mS/cm) | | | |
|---|---|---|---|---|
| | 10 wt % | 20 wt % | 30 wt % | 40 wt % |
| 25° C. | 0.55 (Example 4-1) | 0.29 (Example 4-2) | 0.27 (Example 4-3) | 0.12 (Example 4-4) |
| 60° C. | 1.74 (Example 3-1) | 1.29 (Example 3-2) | 0.97 (Example 3-3) | 0.92 (Example 3-4) |

Figure 6A:
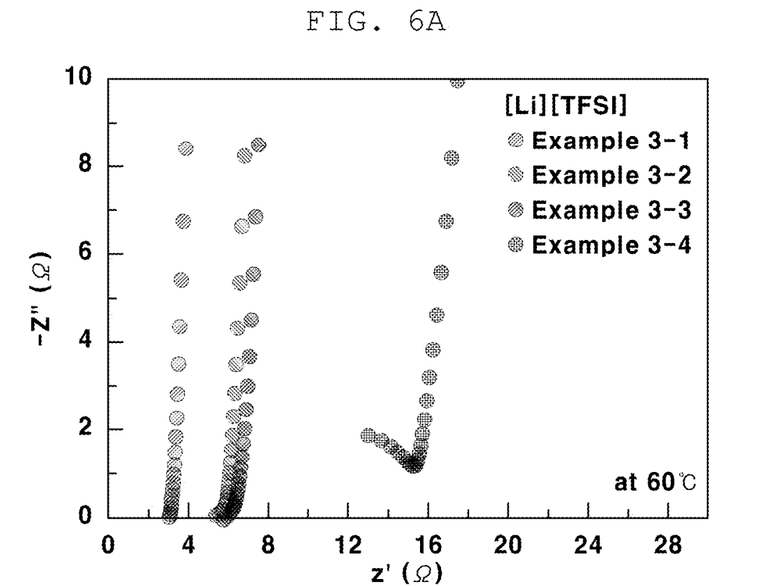
FIG. 6A is a graph showing the results of measurement of the ionic conductivity of the polymer electrolyte of each of Example 3-1(10 wt %), Example 3-2 (20 wt %), Example 3-3 (30 wt %), and Example 3-4 (40 wt %)
Figure 6B:
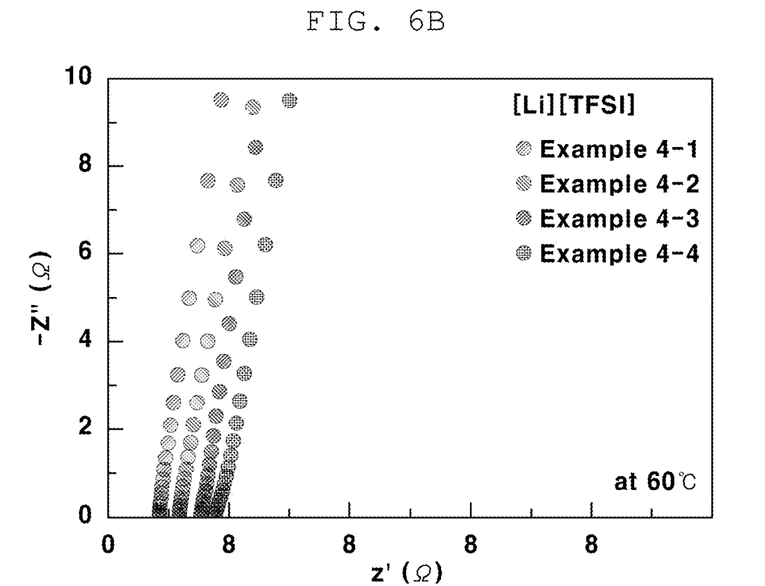
FIG. 6B is a graph showing the results of measurement of the ionic conductivity of the polymer electrolyte of each of Example 4-1 (10 wt %), Example 4-2 (20 wt %), Example 4-3 (30 wt %), and Example 4-4 (40 wt %), according to embodiments of the present disclosure.

With reference to Table 2 and FIGS. 6A and 6B, the higher the temperature and the lower the concentration of the ionic salt, the higher the ionic conductivity of the polymer electrolyte. Specifically, ionic conductivity is decreased with an increase in the amount of the ionic salt, but the polymer electrolyte according to an embodiment of the present disclosure exhibited ionic conductivity of about 1 mS/cm even when the amount of the ionic salt was 20 wt % or more, indicating that ionic conductivity was improved compared to conventional cases.

Test Example 6

Measurement of Electrochemical Window and Cycle Stability Test of Polymer Electrolyte Including Metal Salt The polymer electrolyte of each of Examples 3-1 and 4-1 was prepared, the electrochemical window thereof was measured, and a cycle stability test was performed thereon. The results thereof are shown in FIGS. 7A and 7B.

Figure 7A:
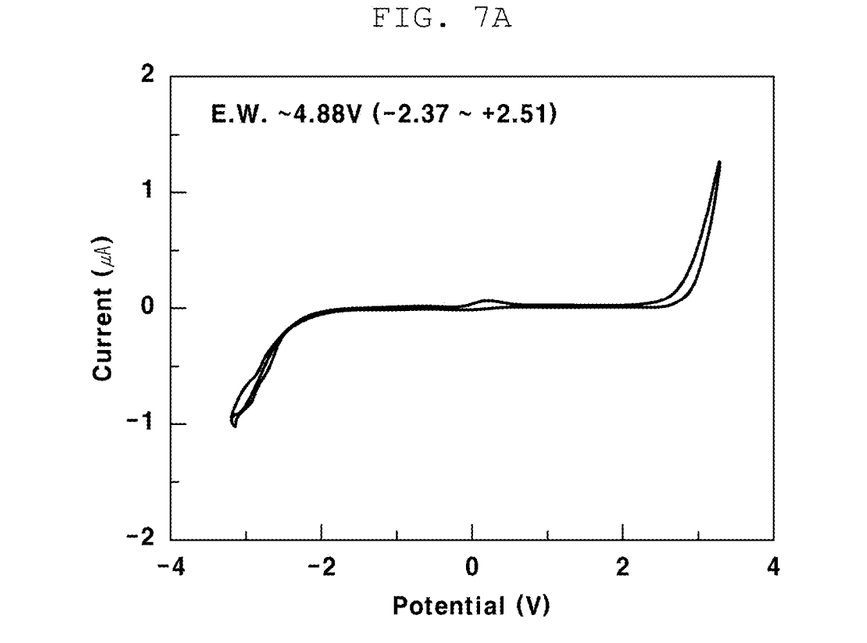
FIG. 7A is a graph showing the electrochemical window of the polymer electrolyte of Example 3-1 according to an embodiment of the present disclosure.

With reference to FIG. 7A, the electrochemical window of the polymer electrolyte of Example 3-1 was 4.88 V, ranging from −2.37 V to +2.51 V, indicating a wide electrochemical window. This is deemed to be because the polymer matrix included in the polymer electrolyte had an ammonium domain and thus had a wider chemical window compared to a conventional polymer electrolyte.

Figure 7B:
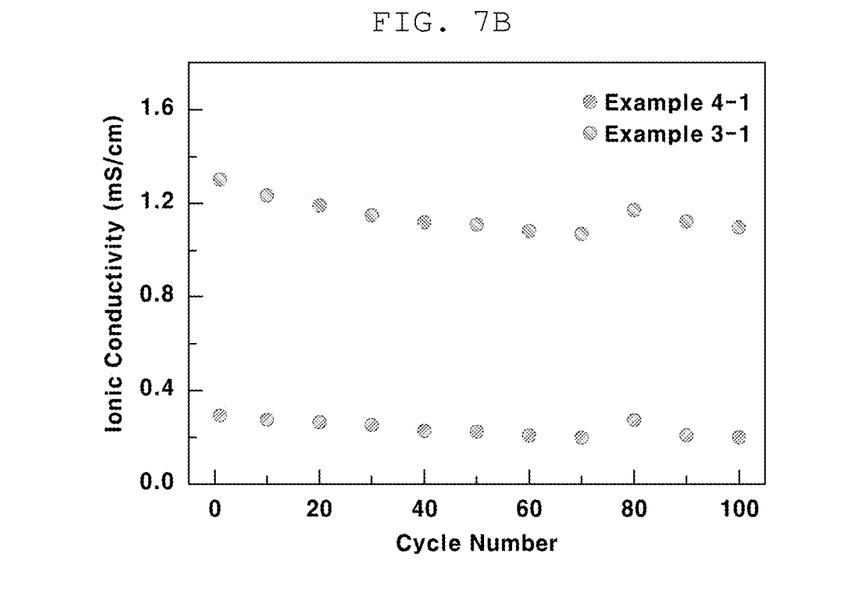
FIG. 7B is a graph showing the results of cycle stability testing of the polymer electrolyte of each of Example 3-1 and Example 4-1 according to embodiments of the present disclosure.

With reference to FIG. 7B, the polymer electrolyte of each of Example 3-1 and Example 4-1 exhibited an ionic conductivity difference of less than 11% even after a change in temperature during 100 cycles.

The polymer electrolyte prepared according to embodiments of the present disclosure includes a polymer matrix, an ionic liquid, and an ionic salt, which are used in appropriate amounts, despite the low glass transition temperature (Tg) of the monomer used to prepare the polymer matrix, thus exhibiting superior mechanical properties, high ionic conductivity, and high stability due to the wide electrochemical window thereof.

What is claimed is:

1. A polymer electrolyte comprising:
   a polymer matrix comprising a polymer having a repeating unit represented by the formula and
an ionic liquid;
wherein $R^1$ to $R^3$ are each independently selected from the group consisting of a substituted or unsubstituted $C_1$-$C_{12}$ alkyl group, a substituted or unsubstituted aryl group, a substituted or unsubstituted heteroaryl group, and combinations thereof;
wherein each $R^4$ is independently selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted $C_5$-$C_{14}$ heteroaryl group, and combinations thereof;
wherein substituents of $R^1$ to $R^4$ are each independently selected from the group consisting of a halogen group, a cyano group, a nitro group, a $C_1$-$C_8$ alkyl group, and combinations thereof;
wherein x is an integer of 1 to 8;
wherein n is an integer of 60 to 3200; and
wherein the polymer electrolyte comprises:
15 to 30 wt % of the polymer matrix, and
70 to 85 wt % of the ionic liquid.

2. The polymer electrolyte of claim 1, wherein a polydispersity index (PDI) of the polymer matrix is 2.00 to 3.00.

3. The polymer electrolyte of claim 1, wherein the ionic liquid comprises an ionic liquid selected from the group consisting of N-methyl-N-butyl-pyrrolidinium bis(trifluoromethylsulfonyl)imide ([P$_{14}$][TFSI]), 1-ethyl-3-methylimidazolium bis(trifluoromethylsulfonyl)imide ([EMI][TFSI]), 1-ethyl-3-methylimidazolium hexafluorophosphate ([EMI][PF6]), 1-ethyl-3-methylimidazolium tetrafluoroborate ([EMI][BF4]), 1-butyl-3-methylimidazolium bis(trifluoromethylsulfonyl)imide ([BMI][TFSI]), 1-butyl-3-methylimidazolium hexafluorophosphate ([BMI][PF6]), 1-butyl-3-methylimidazolium tetrafluoroborate ([BMI][BF4]), and combinations thereof.

4. The polymer electrolyte of claim 1, wherein the polymer electrolyte has an ionic conductivity of 0.50 to 2.60 mS/cm.

5. The polymer electrolyte of claim 1, further comprising a metal salt.

6. The polymer electrolyte of claim 5, wherein an amount of the metal salt is 1.5 to 40.0 wt % based on a total of 100 wt % of the polymer electrolyte.

7. The polymer electrolyte of claim 5, wherein a metal of the metal salt comprises a metal selected from the group consisting of lithium (Li), sodium (Na), potassium (K), calcium (Ca), magnesium (Mg), and combinations thereof.

8. The polymer electrolyte of claim 5, wherein an ionic conductivity of the polymer electrolyte with the metal salt is 0.20 to 1.80 mS/cm.

9. A polymer electrolyte comprising:
A method of preparing a polymer electrolyte, the method comprising:
preparing a polymer matrix comprising a polymer having a repeating unit represented by the formula and
mixing an ionic liquid with the polymer matrix;
wherein $R^1$ to $R^3$ are each independently selected from the group consisting of a substituted or unsubstituted $C_1$-$C_{12}$ alkyl group, a substituted or unsubstituted aryl group, a substituted or unsubstituted heteroaryl group, and combinations thereof;
wherein each $R^4$ is independently selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted $C_5$-$C_{14}$ heteroaryl group, and combinations thereof;
wherein substituents of $R^1$ to $R^4$ are each independently selected from the group consisting of a halogen group, a cyano group, a nitro group, a $C_1$-$C_8$ alkyl group, and combinations thereof;
wherein x is an integer of 1 to 8;
wherein n is an integer of 60 to 3200;
wherein the polymer electrolyte comprises:
15 to 30 wt % of the polymer matrix, and
70 to 85 wt % of the ionic liquid.

10. The method of claim 9, wherein a polydispersity index (PDI) of the polymer matrix is 2.00 to 3.00.

11. The method of claim 9, wherein the ionic liquid comprises an ionic liquid selected from the group consisting of N-methyl-N-butyl-pyrrolidinium bis(trifluoromethylsulfonyl)imide ([P$_{14}$][TFSI]), 1-ethyl-3-methylimidazolium bis(trifluoromethylsulfonyl)imide ([EMI][TFSI]), 1-ethyl-3-methylimidazolium hexafluorophosphate ([EMI][PF6]), 1-ethyl-3-methylimidazolium tetrafluoroborate ([EMI][BF4]), 1-butyl-3-methylimidazolium bis(trifluoromethylsulfonyl)imide ([BMI][TFSI]), 1-butyl-3-methylimidazolium hexafluorophosphate ([BMI][PF6]), 1-butyl-3-methylimidazolium tetrafluoroborate ([BMI][BF4]), and combinations thereof.

12. The method of claim 9, wherein the polymer electrolyte has an ionic conductivity of 0.50 to 2.60 mS/cm.

13. The method of claim 9, further comprising mixing a metal salt.

14. The method of claim 13, wherein an amount of the metal salt is 1.5 to 40.0 wt % based on a total of 100 wt % of the polymer electrolyte.

15. The method of claim 13, wherein a metal of the metal salt comprises a metal selected from the group consisting of lithium (Li), sodium (Na), potassium (K), calcium (Ca), magnesium (Mg), and combinations thereof.

16. The method of claim 13, wherein an ionic conductivity of the polymer electrolyte with the metal salt is 0.20 to 1.80 mS/cm.

17. The method of claim 9, wherein preparing the polymer matrix is performed in one pot.

18. A battery comprising:
an anode;
a cathode; and
polymer electrolyte comprising:
an ionic liquid, and
a polymer matrix comprising a polymer having a repeating unit represented by the formula and
wherein $R^1$ to $R^3$ are each independently selected from the group consisting of a substituted or unsubstituted $C_1$-$C_{12}$ alkyl group, a substituted or unsubstituted aryl group, a substituted or unsubstituted heteroaryl group, and combinations thereof,
wherein each $R^4$ is independently selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted $C_5$-$C_{14}$ heteroaryl group, and combinations thereof,
wherein substituents of $R^1$ to $R^4$ are each independently selected from the group consisting of a halogen group, a cyano group, a nitro group, a $C_1$-$C_8$ alkyl group, and combinations thereof,
wherein x is an integer of 1 to 8,
wherein n is an integer of 60 to 3200,
wherein the polymer electrolyte comprises:
15 to 30 wt % of the polymer matrix, and
70 to 85 wt % of the ionic liquid.

19. The battery of claim 18, wherein a polydispersity index (PDI) of the polymer matrix is 2.00 to 3.00.

20. The battery of claim 18, wherein the ionic liquid comprises an ionic liquid selected from the group consisting of N-methyl-N-butyl-pyrrolidinium bis(trifluoromethylsulfonyl)imide ([P$_{14}$][TFSI]), 1-ethyl-3-methylimidazolium bis(trifluoromethylsulfonyl)imide ([EMI][TFSI]), 1-ethyl-3-methylimidazolium hexafluorophosphate ([EMI][PF6]), 1-ethyl-3-methylimidazolium tetrafluoroborate ([EMI][BF4]), 1-butyl-3-methylimidazolium bis(trifluoromethylsulfonyl)imide ([BMI][TFSI]), 1-butyl-3-methylimidazolium hexafluorophosphate ([BMI][PF6]), 1-butyl-3-methylimidazolium tetrafluoroborate ([BMI][BF4]), and combinations thereof.

* * * * *

UNITED STATES PATENT AND TRADEMARK OFFICE
CERTIFICATE OF CORRECTION

| | | |
|---|---|---|
| PATENT NO. | : 11,949,068 B2 | Page 1 of 1 |
| APPLICATION NO. | : 17/375167 | |
| DATED | : April 2, 2024 | |
| INVENTOR(S) | : Lee et al. | |

It is certified that error appears in the above-identified patent and that said Letters Patent is hereby corrected as shown below:

In the Claims

In Column 16, in Claim 9, Line 1, delete "A polymer electrolyte comprising:".

In Column 17, in Claim 18, Line 9, before "polymer" insert -- a --.

Signed and Sealed this
Fourteenth Day of May, 2024

Katherine Kelly Vidal
*Director of the United States Patent and Trademark Office*